(12) United States Patent
Verde Preckler et al.

(10) Patent No.: US 8,550,397 B2
(45) Date of Patent: Oct. 8, 2013

(54) ACOUSTICALLY ATTENUATED FUSELAGE FOR AIRCRAFT

(75) Inventors: Jorge Pablo Verde Preckler, Madrid (ES); Maria Caballero Asensio, Madrid (ES)

(73) Assignee: Airbus Operations S.L., Madrid (ES)

( * ) Notice: Subject to any disclaimer, the term of this patent is extended or adjusted under 35 U.S.C. 154(b) by 743 days.

(21) Appl. No.: 12/069,917

(22) Filed: Feb. 13, 2008

(65) Prior Publication Data

US 2009/0152400 A1    Jun. 18, 2009

(30) Foreign Application Priority Data

Dec. 13, 2007 (ES) .................................. 200703295

(51) Int. Cl.
*B64C 1/40* (2006.01)
*B64C 1/12* (2006.01)

(52) U.S. Cl.
USPC .................. 244/1 N; 244/119; 244/129.1

(58) Field of Classification Search
USPC .................. 244/1 N, 129.1, 132, 119, 131
See application file for complete search history.

(56) References Cited

U.S. PATENT DOCUMENTS

| | | | | |
|---|---|---|---|---|
| 1,991,832 A * | 2/1935 | Zand | ............... | 52/204.597 |
| 2,503,109 A * | 4/1950 | Harris | ............... | 343/705 |
| 2,581,625 A * | 1/1952 | Brady | ............... | 244/129.1 |
| 2,929,586 A * | 3/1960 | Hurd, Jr. et al. | ............... | 244/129.1 |
| 5,014,934 A * | 5/1991 | McClaflin | ............... | 244/132 |
| 5,803,406 A * | 9/1998 | Kolodziej et al. | ............... | 244/171.7 |
| 7,291,373 B2 * | 11/2007 | Bartley-Cho et al. | ............... | 428/61 |

* cited by examiner

*Primary Examiner* — Joseph W Sanderson
(74) *Attorney, Agent, or Firm* — Ladas & Parry LLP

(57) ABSTRACT

A covering of a fuselage for aircraft having propeller engines, including an opening which is surrounded by a structural frame formed by ribs and stringers of the aircraft around the area of maximum acoustic impact of the propeller engines. The opening further includes a non-structural panel joined to the structural frame by a non-rigid joint which considerably attenuates the vibrations through such joint, thus reducing the indirect acoustic noise and the indirect structural noise generated by the propeller engines inside the passenger cabin of the aircraft.

10 Claims, 4 Drawing Sheets

ACOUSTICALLY ATTENUATED FUSELAGE FOR AIRCRAFT

OBJECT OF THE INVENTION

The present invention relates to an acoustically attenuated fuselage covering for aircraft, in particular for aircraft with propeller engines.

BACKGROUND OF THE INVENTION

Aircraft generate high acoustic contamination levels, the engine being one of the greatest noise generators. In the case of reaction engines, these engines are protected by means of the cowling, reducing the noise considerably. This noise reduction is not only sought for the outside of the aircraft, but rather for protecting the passengers from the inconveniences during the trip.

In the case of propeller engines, the most common is that such engines are not protected by this cowl, therefore all the noise is transmitted through the air through the propagation of sound waves and through structural vibrations.

The noise generated by this type of engine located in the rear part of the aircraft is produced in several ways:

Direct acoustic noise: by means of the propagation of sound waves from the engine to the cabin through the air;

Indirect acoustic noise: by means of the propagation of sound waves from the engine through the covering of the tail-cone, subsequent propagation through the air and finally through the pressure bulkhead;

Direct structural noise: from the engine through the pylon and the fuselage structure of the aircraft.

Indirect structural noise: a direct acoustic noise from the engines to the covering of the tail-cone and subsequently through the structure of the tail-cone to the cabin.

Studies carried out show that the noises which most affect the passenger cabin are indirect acoustic and indirect structural noise. The present invention will reduce the noise generated by both models.

In addition, aircraft with propeller engines use several noise dampening systems such as passive dampening systems (hydraulic and/or mechanical systems reducing the vibrations in the fixing of the engine in the structure of the aircraft), active dampening systems (microphone systems located throughout the airplane which register the vibrations of the propellers and emit in frequencies counteracting the vibrations) and thermal and acoustic insulating blankets which are arranged inside the covering. The drawback of these dampening systems described is that they involve a very high excess weight for the aircraft, at the same time also raising the costs given that they require a subsequent assembly in the aircraft.

The present invention solves the previous drawback.

SUMMARY OF THE INVENTION

The object of this invention is to reduce the indirect acoustic noise and the indirect structural noise generated by a propeller engine inside the passenger cabin of an aircraft by means of using a covering comprising an opening in which a non-structural panel in turn comprising a non-metal sandwich-type core has been assembled. The propagation of sound waves to the rear fuselage of the aircraft is consequently reduced upon passing through this covering, the pressure bulkhead with this configuration transmitting less vibrations (which will generate less noise) inside the passenger cabin.

In order to dampen the vibrations through the structure of the aircraft, the non-structural sandwich panel of the invention is joined to the rest of the tail-cone structure by means of a rather non-rigid joint which greatly attenuates noise, based on a rubber block or sealer.

The present invention thus reduces the weight regarding known dampening systems, since dampening systems are needed to a lesser extent. In addition, the assembly costs are also reduced given that the present invention is part of the manufacturing of the fuselage, not part of a subsequent assembly.

Other features and advantages of the present invention will be understood from the following detailed description of an illustrative embodiment of its object in relation to the attached figures.

DETAILED DESCRIPTION OF THE INVENTION

The present invention relates to the form and structure of a covering 22 of the fuselage 1 of an aircraft comprising propeller engines 3 in the are acoustically affected by the propeller engines 3.

Figure 6:
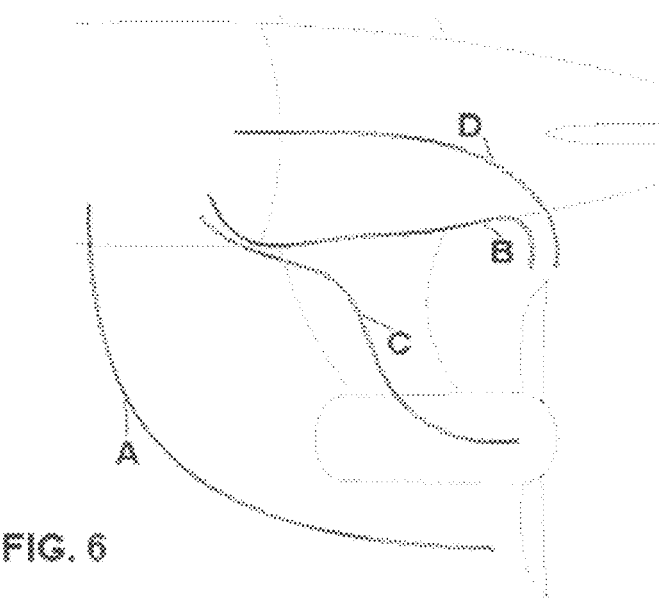
FIG. 6 shows a schematic view of an enlargement of FIG. 1 in which the four noise propagation models from the propellers to the passenger cabin of an aircraft are shown.

The noise generated by the propeller engines 3 in the rear part of an aircraft is produced in several ways as understood from FIG. 6:

Direct acoustic noise by means of the propagation of sound waves from the engine 3 to the cabin through the air, according to A in FIG. 6.

Indirect acoustic noise by means of the propagation of sound waves from the engine 3 through the covering 22 of the tail-cone of the aircraft, subsequent propagation through the air and finally through the rear pressure bulkhead 2, according to B in FIG. 6.

Direct structural noise from the engine 3 through the pylon and fuselage 1 structure of the aircraft, according to C in FIG. 6.

Indirect structural noise, this noise being a direct acoustic noise from the engines 3 to the covering 22 of the tail-cone and subsequently through the tail-cone structure to the cabin, according to D in FIG. 6.

Given that the noises which most affect the passenger cabin are indirect acoustic and indirect structural noises, the present invention will reduce both.

For the case of the indirect acoustic noise model, the present invention thus provides a preferably sandwich-type non-structural panel 7 with great acoustic attenuation through the mentioned panel 7 in the area of maximum acoustic impact of the propellers 14.

For the case of the indirect structural noise model, since the structural rigidity aids the propagation of the vibrations, the present invention provides an opening 12 surrounded by a structural frame formed by the ribs 5 and the stringers 6 around the area of maximum acoustic impact of the propellers 14, inside which is located a non-structural panel 7 joined to the front structural frame by means of a rather non-rigid joint which considerably attenuates the vibrations through such joint.

The object of the invention is to reduce the indirect acoustic noise and the indirect structural noise generated by the propeller engines 3 inside the passenger cabin of an aircraft by means of using a covering 22 of the tail-cone of the aircraft comprising an opening 12 in which a non-structural panel 7 in turn comprising a non-metal sandwich-type core has been assembled.

Figure 1:
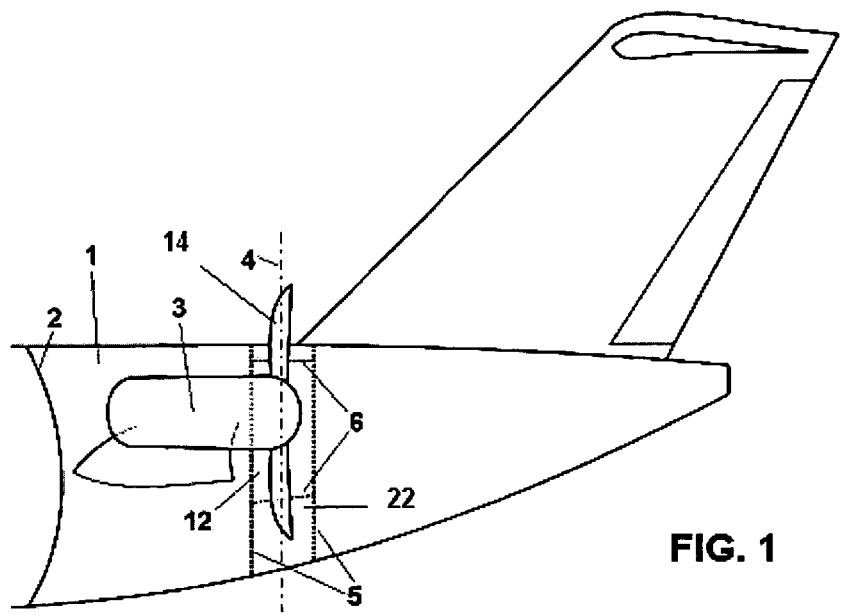
FIG. 1 shows a schematic profile view of an aircraft with propeller engines located in the rear part thereof, comprising the acoustic attenuation covering of the invention.
Figure 2:
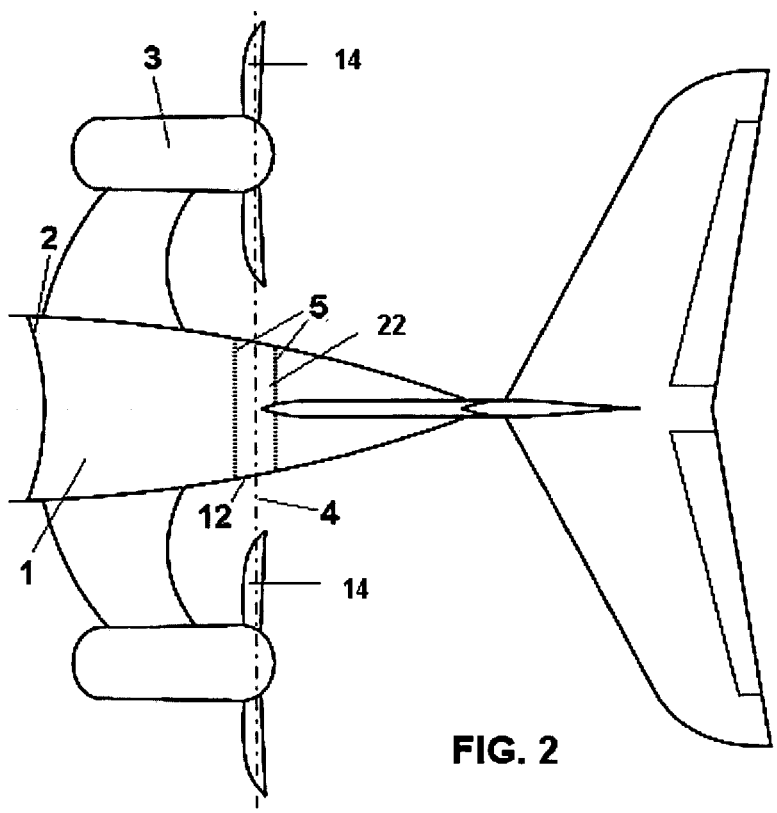
FIG. 2 shows a schematic plan view of an aircraft with propeller engines located in the rear part thereof, comprising the acoustic attenuation covering of the invention.
Figure 3:
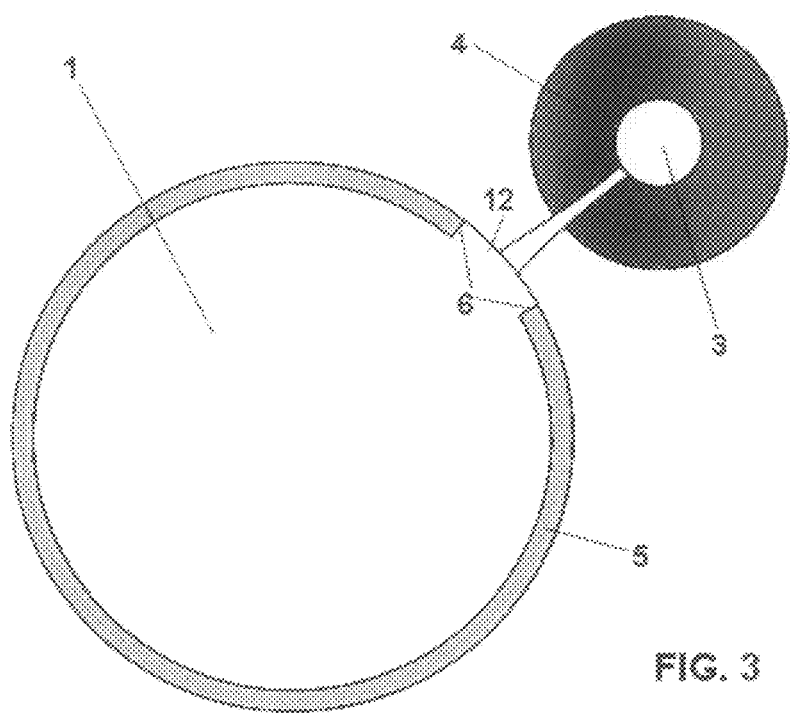
FIG. 3 shows a schematic view of a section in the plane of the propeller of the engines of an aircraft comprising the acoustic attenuation covering of the invention.
Figure 4:
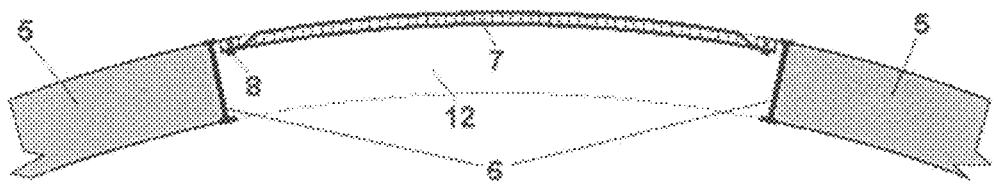
FIG. 4 shows a schematic view of a section in the plane of the propeller of the opening of the acoustic attenuation covering of the invention.
Figure 5:
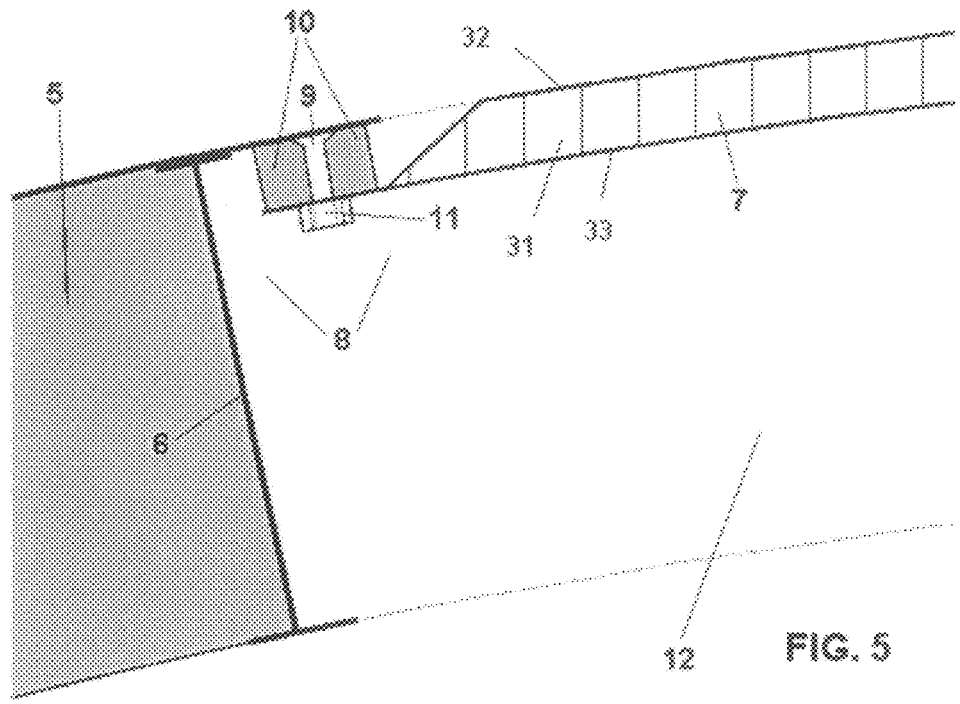
FIG. 5 shows a schematic view of a section of FIG. 4 in detail in which the dampener of the acoustic attenuation covering of the invention is shown.

As seen in FIGS. 1 and 2, the area in which the sound waves generated by the propellers 14 directly impact is the surface of the covering 22 of the tail-cone of the mentioned aircraft. The waves traverse the covering 22 and once inside the tail-come, they are propagated through the air to the rear pressure bulkhead 2 of the aircraft, traversing it and subsequently reaching the passenger cabin.

Likewise the second mode of transmitting the noise to the passenger cabin is carried out from the propellers 14 to the covering 22 of the tail-cone, making it vibrate, the mentioned covering 22 structurally transmitting this vibration to the passenger cabin of the aircraft.

In order to achieve that the waves are not transmitted through the covering 22 of the tail-cone, it is necessary that the mentioned covering 22 attenuates the waves. Additionally, so that the waves are not transmitted along the covering 22 of the tail-cone, the tail-cone must attenuate the propagation of vibrations. The present invention proposes using a non-structural panel 7 in an opening 12 arranged between the ribs 5 and the stringers 6 of the fuselage 1 in the tail-cone area of the aircraft, this opening 12 being the area of greatest impact of the sound waves caused by the engine 3 in the area of the plane of the propeller 4. This non-structural panel 7 is preferably screwed to the ribs 5 and the stringers 6 around which the typical structure of the covering 22 continues, with the rest of its stringers 6 and ribs 5. This structure is used to hold the panel 7.

The non-structural panel 7 is preferably a sandwich-type structure comprising a core 31 in turn comprising an upper skin 32 and a lower skin 33. The selection of the core 31 to be used in the sandwich-type panel 7 must be carried out based on those materials which generate greater acoustic insulation, such as the ROHACELL core (closed-cell rigid polymethacrylimide foam) for example. This type of core has better thermal and acoustic characteristics than the NOMEX core (meta-aramide-KEVLAR fiber impregnated with phenolic resin), although its specific resistance is less.

Manufacturing the sandwich-type panel 7 structure is known and does not differ from the sandwich structures used in landing gear traps or in aircraft rudders.

The reinforcement structure of the opening 12 to which the panel 7 must be fixed preferably comprises front and rear ribs 5 before and after the plane of the propellers 4 and two stringers or beams 6.

The dampening system for dampening the sound waves in the contour of the joint of the panel 7 to the fuselage 1 which is preferably used is a dampening rubber 10 between the covering 22 and the panel 7, said dampening rubber 10 being fixed by a fixing element, for example a screw 9 and a nut 11. The rubber to be used must be of the silicon foam rubber type with vibration dampening properties, such as HT-606A/BF-1005 from New Metals & Chemicals Waltham Abbey for example. This dampening rubber can also be substituted by a sealing bed, for example the placing sealer (polysulfide sealer) PR-1776-A2-A from Le Joint Francais used in access cover joints screwed to closing ribs. The fixing elements can be a screw 9 or bolt together with a nut 11 or sealed nut.

Figure 7:
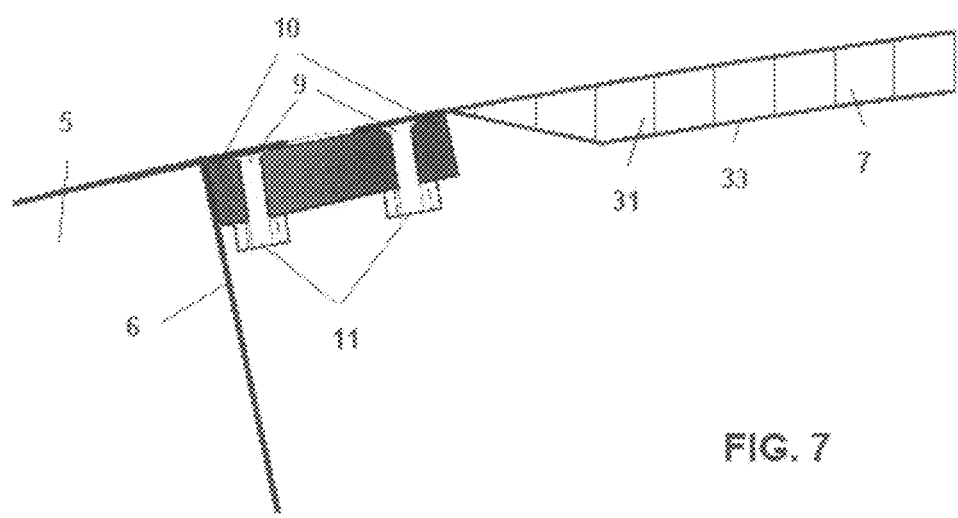
FIG. 7 shows a schematic view of a section of FIG. 4 in detail in which a second configuration of the acoustic attenuation covering of the invention is shown.

According to another embodiment of the invention it is also possible to assemble the dampening system such as described in FIG. 7, using the same materials as in the previous description, although in this case the dampening rubber 10 between the covering 22 and the panel 7 is fixed by two fixing elements, a screw 9 and a nut 11 for holding it to the covering 22 and another screw 9 and another nut 11 for holding it to the panel 7. The space remaining between the covering 22 and the panel 7 can be filled with placing sealer (polysulfide sealer).

In the preferred embodiments just described, any modifications comprised within the scope defined by the following claims can be introduced.

The invention claimed is:

1. A covering (22) of a fuselage (1) for aircraft comprising propeller engines (3), said covering (22) comprising:
    an opening (12) which is surrounded by a structural frame formed by ribs (5) and stringers (6) of the aircraft around an area of maximum acoustic impact of the propeller engines (3),
    said opening (12) further comprising a non-structural panel (7), wherein a peripheral flange of the non-structural panel is joined to the structural frame by means of a non-rigid joint which attenuates vibrations through said joint, thus reducing indirect acoustic noise and indirect structural noise generated by the propeller engines (3) inside a passenger cabin of the aircraft,
    wherein the covering (22) surrounds the fuselage (1) around the entire perimeter of the fuselage (1), and
    wherein the non-structural panel (7) comprises a non-metal sandwich-type core (31) in turn comprising an upper skin (32) and a lower skin (33).

2. The covering (22) of a fuselage (1) for aircraft according to claim 1, wherein the core (31) is a core with closed-cell rigid polymethacrylimide foam.

3. The covering (22) of a fuselage (1) for aircraft according to claim 1, wherein the panel (7) is screwed to the ribs (5) and the stringers (6) of the aircraft such that the panel (7) is held.

4. The covering (22) of a fuselage (1) for aircraft according to claim 1, wherein a reinforcement structure of the opening (12) to which the panel (7) is fixed comprises front and rear ribs (5) and two stringers or beams (6).

5. The covering (22) of a fuselage (1) for aircraft according to claim 1, wherein a dampening system for dampening sound waves in the contour of the joint of the panel (7) to the fuselage (1) comprises a dampening rubber (10).

6. The covering (22) of a fuselage (1) for aircraft according to claim 5, wherein the rubber (10) is of a silicon foam rubber type with vibration dampening properties.

7. The covering (22) of a fuselage (1) for aircraft according to claim 5, wherein the dampening system for dampening the sound waves in the contour of the joint of the panel (7) to the fuselage (1) is fixed by a screw (9) and a nut (11).

8. The covering (22) of a fuselage (1) for aircraft according to claim 5, wherein the dampening system for dampening the sound waves in the contour of the joint of the panel (7) to the fuselage (1) is fixed by a screw (9) and a nut (11) to the covering (22) and by another screw (9) and another nut (11) to the panel (7).

9. The covering (22) of a fuselage (1) for aircraft according to claim 1, wherein a dampening system for dampening sound waves in the contour of the joint of the panel (7) to the fuselage (1) comprises a sealer bed.

10. The covering (22) of a fuselage (1) for aircraft according to claim 9, wherein the sealer bed comprises a placing sealer or a polysulfide sealer.

* * * * *